(12) United States Patent
Collet et al.

(10) Patent No.: US 9,712,997 B2
(45) Date of Patent: Jul. 18, 2017

(54) PROCESSING OF CELLULAR RADIO DATA IMPLEMENTED BY A SIM CARD, PARTICULARLY FOR SECURITY PURPOSES

(71) Applicant: ORANGE, Paris (FR)

(72) Inventors: Yann Collet, Issy les Moulineaux (FR); Pierre Lemoine, Benouville (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/970,902

(22) Filed: Dec. 16, 2015

(65) Prior Publication Data

US 2016/0183080 A1    Jun. 23, 2016

(30) Foreign Application Priority Data

Dec. 19, 2014    (FR) .................................... 14 63025

(51) Int. Cl.
| | |
|---|---|
| *H04W 8/22* | (2009.01) |
| *H04W 60/04* | (2009.01) |
| *H04B 1/3816* | (2015.01) |
| *H04W 64/00* | (2009.01) |
| *H04L 29/06* | (2006.01) |
| *H04W 12/08* | (2009.01) |
| *H04W 4/02* | (2009.01) |
| *H04W 8/04* | (2009.01) |

(52) U.S. Cl.
CPC ............ *H04W 8/22* (2013.01); *H04B 1/3816* (2013.01); *H04L 63/101* (2013.01); *H04W 12/08* (2013.01); *H04W 60/04* (2013.01); *H04W 64/006* (2013.01); *H04W 4/02* (2013.01); *H04W 8/04* (2013.01)

(58) Field of Classification Search
CPC ...... H04B 1/3816; H04W 8/22; H04W 12/08; H04W 64/00
USPC .......................... 455/404.2, 440, 456.1, 558
See application file for complete search history.

(56) References Cited

U.S. PATENT DOCUMENTS

| | | | |
|---|---|---|---|
| 5,548,816 A | 8/1996 | DeVaney | |
| 2010/0178931 A1* | 7/2010 | Busropan | H04W 64/00 455/456.1 |

(Continued)

FOREIGN PATENT DOCUMENTS

| | | |
|---|---|---|
| EP | 1 274 264 A1 | 1/2003 |
| EP | 1 799 006 A1 | 6/2007 |
| EP | 1 879 414 A1 | 1/2008 |

OTHER PUBLICATIONS

Search Report issued in related application FR 14 63025, Aug. 5, 2015, 2 pages.

*Primary Examiner* — Tuan Pham
(74) *Attorney, Agent, or Firm* — Drinker Biddle & Reath LLP

(57) ABSTRACT

Processing of cellular radio data, in particular by a SIM card of a terminal in a mobility situation, said SIM card receiving a current cell identifier and comparing the current identifier with an identifier previously stored in memory, in order to generate a notification intended for a remote server when there is a difference between the current identifier and an identifier previously stored in memory. More particularly, the SIM card stores in memory a list of current identifiers of respective cells in which the terminal is successively located, and the sending of a notification to the server occurs only if the current identifier is absent from this list.

11 Claims, 2 Drawing Sheets

(56) References Cited

U.S. PATENT DOCUMENTS

2012/0172081 A1\* 7/2012 Love ................. H04W 52/367
　　　　　　　　　　　　　　　　　　　　　455/522
2012/0203905 A1　 8/2012 Lee et al.
2013/0211706 A1\* 8/2013 MacNaughtan ..... G08G 1/0112
　　　　　　　　　　　　　　　　　　　　　701/410

\* cited by examiner

PROCESSING OF CELLULAR RADIO DATA IMPLEMENTED BY A SIM CARD, PARTICULARLY FOR SECURITY PURPOSES

CROSS-REFERENCE TO RELATED PATENT APPLICATION

This application claims the benefit of French Patent Application No. 14 63025, filed on Dec. 19, 2014, in the French Institute of Industrial Property, the entire content of which is incorporated herein by reference.

BACKGROUND

The present invention relates to the processing of cellular radio data, implemented by computer means of a SIM card, in particular in order to monitor the current location of a terminal that is housing the SIM card, for example for security purposes.

The terminal may, for example, be a device communicating with a server via a cellular radio network, such as a payment terminal in a store or restaurant. For security reasons, it is undesirable to enable a malicious user to misappropriate the terminal in order to steal data or for other purposes.

To this end, a remote server (for example a verification server) monitors the location of the terminal based on radiofrequency identifiers of the cells where the terminal is located. The SIM card of the terminal usually manages the transmission of cell change notifications to the server.

Thus, the SIM card of a terminal that is mobile usually receives from the network a current cell identifier (for example at regular times or when establishing communication), and transmits these cell identifiers to a server which uses these data to verify that the terminal has not moved beyond a certain distance from a predetermined position.

However, the receiving and processing by the server of all these notifications, each time a cell identifier is received, generates a large workload for the server.

To limit this problem, it could be provided that the SIM card:
  compares the current cell identifier with an identifier previously stored in memory (typically the cell identifier indicated by the network at the previous moment, or during the last communication),
  and then generates a notification for the remote server only if there is a difference between the current identifier and the cell identifier previously stored in memory.

However, here again, in some situations, for example where the payment terminal is in a large restaurant or a department store covered by several cells at once, the mobile payment terminal can generate a large number of notifications from the SIM to the server, with each change of cell.

Such notifications would then reduce the SIM card processing speed, and the payment terminal would experience unnecessary delays. The server itself must still process all these notifications it receives even though these terminal locations are not unusual and are very close to the presumed original location.

SUMMARY

The present invention improves the situation.

For this purpose, it proposes a method for processing cellular radio data, implemented by computer means including a SIM card, wherein the SIM card of a terminal that is in a mobility situation:

receives a current cell identifier,
compares the current identifier with an identifier previously stored in memory,
the SIM card being adapted to generate a notification for a remote server when there is a difference between the current identifier and an identifier previously stored in memory.

In particular, the SIM card stores in memory a list of current identifiers of respective cells in which the terminal is successively located, and the sending of a notification to the server occurs only if the current identifier is absent from said list.

Thus, the SIM card of the invention maintains a whitelist of cells within which the terminal is able to travel (for example cells adjacent to a predetermined original location). When in a mobility situation, as long as the terminal is moved to one of these known cells, the SIM card does not send a notification to the server and does not overload its own resources, those of the terminal, and those of the server.

Thus, in one particular embodiment, the SIM card carries out the following steps after receiving a current cell identifier:
  a) determines whether the current cell identifier is in said list, and if the current cell identifier is not in the list:
  b) sends a change of cell notification to the server, and
  c) stores the current cell identifier in the list.

Of course, in step a), if the current cell identifier is in said list, the SIM card does not send a change of cell notification to the server.

It should be noted that the term "SIM card" employed above is commonly used to designate a "UICC" card ("Universal Integrated Circuit Card" as defined by the ETSI organization) with at least one of the following embedded applications: SIM, USIM, ISIM, and HPSIM (defined by the 3GPP standard). It is understood that here the term "SIM card" designates such a UICC card.

Advantageously, the implementation of the invention does not alter the security of the terminal location verification in any manner.

For example, in one embodiment, a notification sent by the SIM card to the server comprises the current cell identifier, allowing the server to compare a current location of the terminal, corresponding to the current cell identifier, to a predetermined location (typically a presumed original location), and to execute an alert routine if the current location does not satisfy a chosen criterion relative to the predetermined location.

For example, the server can execute said alert routine if the current location and the predetermined location are separated by a distance greater than a chosen distance threshold.

In one embodiment, upon receipt of an alert message from the server, the SIM card disables any transmission of cell change notifications to the server. The SIM card thus no longer sends cell change notifications to the server, which again avoids overloading the server with the processing of unnecessary notifications.

In one embodiment, the SIM card receives a command from the server to initiate execution of the steps of the method, for example after the SIM card is first placed in use. In this case, the server can retrieve the first cell identifier that the SIM card sends to it and can thus predetermine that this is said original location.

As previously stated, the invention finds advantageous applications in the case of a terminal corresponding to equipment such as a payment terminal, or leased equipment that should not leave a predefined area (such as construction equipment). The SIM card then implements a security process as part of a machine-to-machine application. Thus, in one embodiment, the terminal is intended for communicating with the remote server in machine-to-machine mode.

The invention also relates to a SIM card comprising means including a memory programmed to carry out the steps of the above method.

The invention also relates to a computer program comprising instructions for implementing the above method when the program is executed by a processor. The invention aims thus also at a non-transitory computer readable medium, storing instructions of such a computer program.

BRIEF DESCRIPTION OF THE DRAWINGS

Other features and advantages of the invention will be apparent from the following detailed description and the accompanying drawings in which.

DETAILED DESCRIPTION

Figure 1:
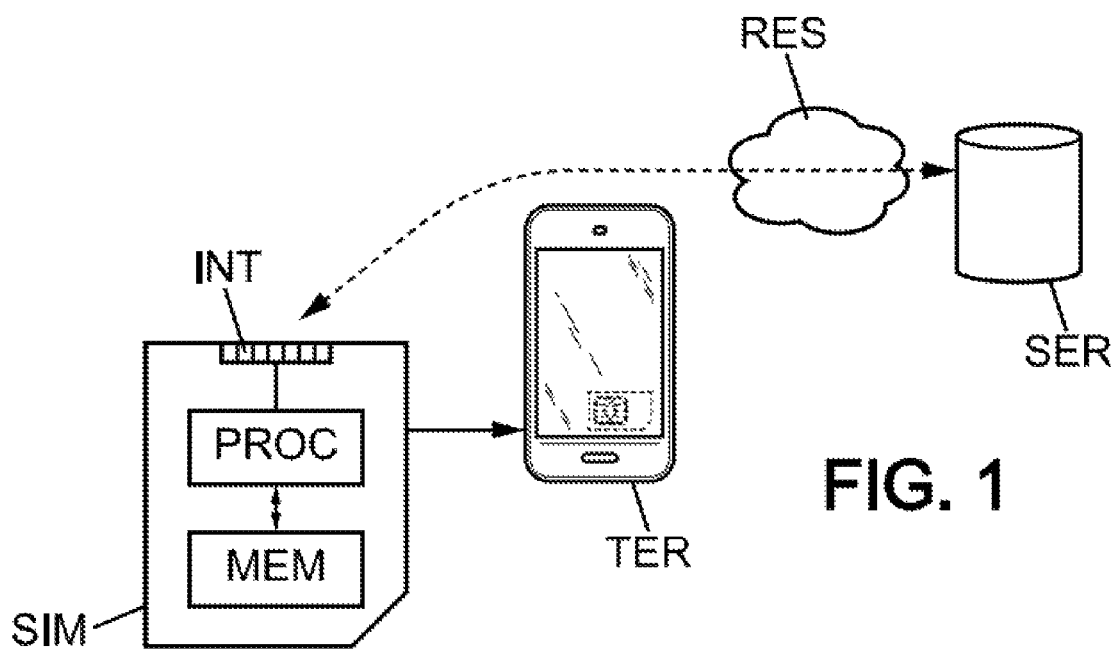
FIG. 1 illustrates the hardware components involved in the implementation of the method, according to one exemplary embodiment.

Referring to FIG. 1, the SIM card typically comprises a microcontroller (including for example a processor PROC) and a memory unit MEM with for example:
  RAM working memory, for example for storing a current cell identifier CellC,
  non-volatile memory for storing:
    computer program instructions which are executed to implement the above method, and
    said list of cell identifiers previously notified to the server.

The SIM card further comprises an interface INT for connecting with the terminal TER where it is housed. When in use, the SIM card can communicate over the network RES with a control server SER, which the SIM card notifies of successive changes of cells whose identifiers are not in the list. It is understood that this computer program can typically have an algorithm whose flowchart is represented by FIG. 2b discussed below.

Figure 2A:
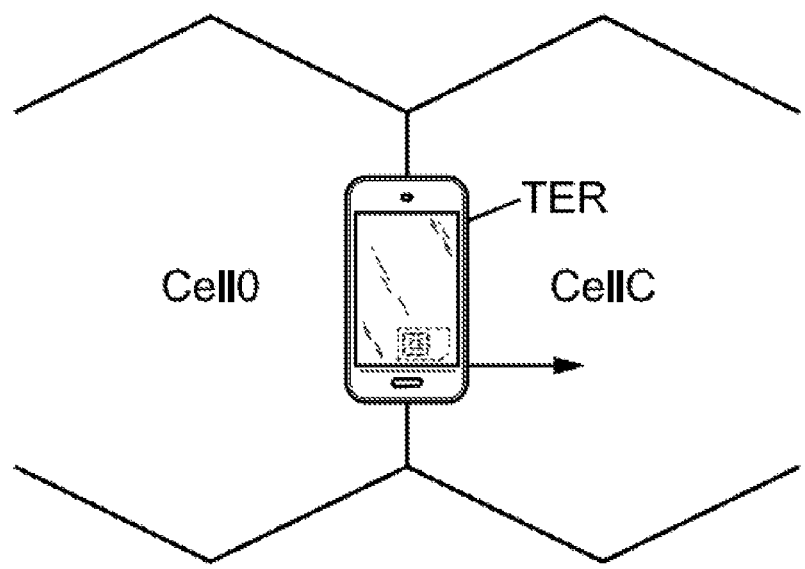
FIG. 2a illustrates a mobility situation for a terminal comprising a SIM card according to the invention.
Figure 2B:
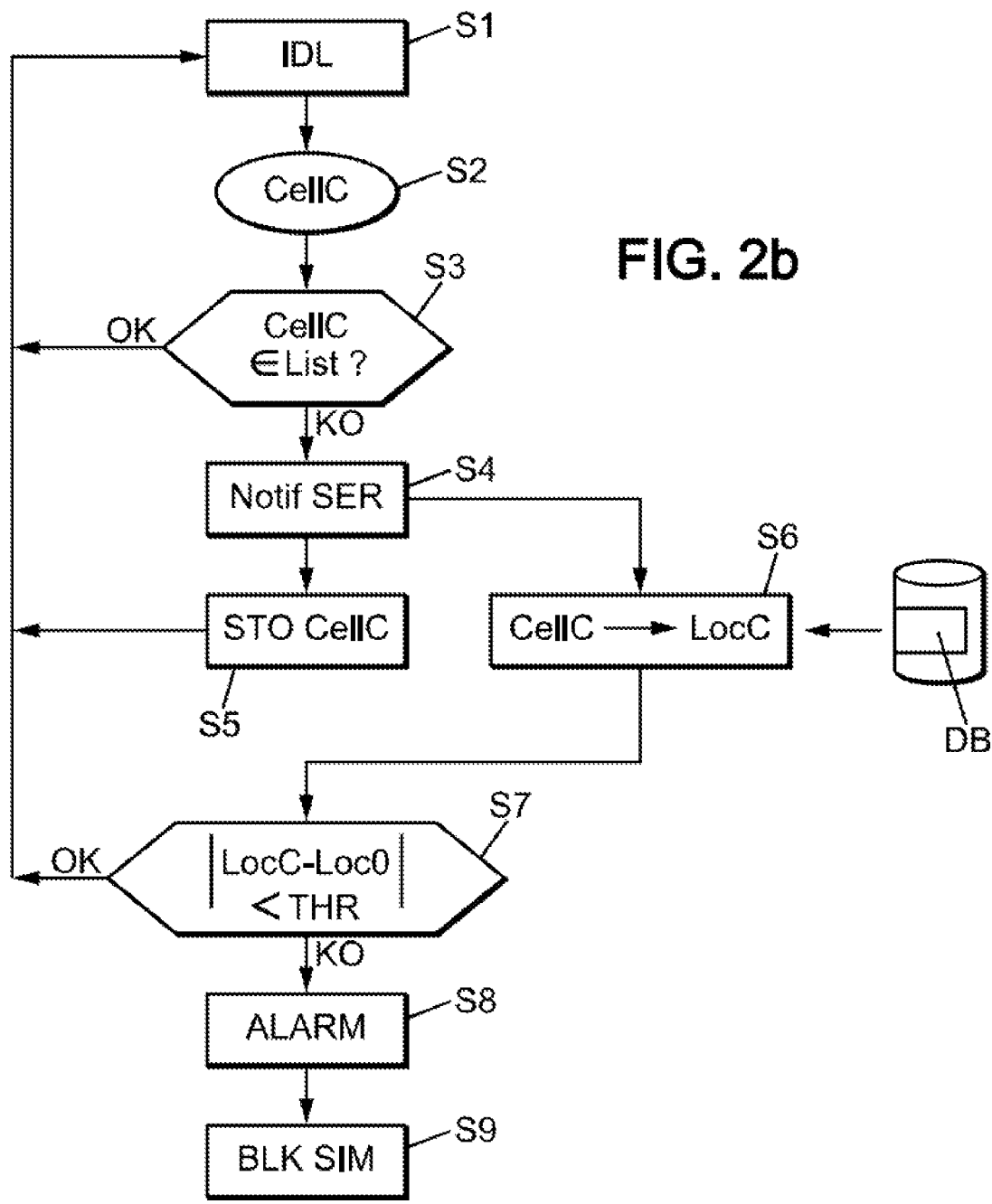
FIG. 2b illustrates the steps of a method of the invention according to one exemplary embodiment.

Referring to FIG. 2b, the process begins with a first step S1, in which, for example, the SIM card sends an initial identifier Cell0 of the cell where the SIM card was placed in service for the first time in the terminal TER. This identifier Cell0 is stored in the SIM card memory in a whitelist of cell identifiers where the terminal TER has successively been located.

Then, when the terminal is in a mobility situation where it is moving toward a current cell of current identifier CellC, as illustrated in FIG. 2a, in step S2 the SIM card retrieves this current identifier CellC. The SIM card checks in step S3 whether this current identifier CellC is already in a list of cell identifiers stored by the SIM card and which corresponds to all the successive cells with which the terminal has connected (since the SIM was placed in service within that terminal).

If the current cell identifier CellC is already in that list (OK arrow from test S3), the SIM card does not send a notification to the server SER and returns to a standby mode awaiting a possible new mobility situation.

However, if the current cell identifier CellC is not in that list (KO arrow from test S3), in step S4 the SIM card sends a notification to the server SER which includes the current cell identifier CellC, and in step S5 it updates the list it has stored by adding the current cell identifier CellC. Next, the SIM card returns to a standby mode awaiting a possible new mobility situation.

In the example described here, the method continues on the server SER which, upon receiving the notification containing the current cell identifier CellC, determines in step S6 a current location LocC corresponding to the current cell identifier CellC. To do so, the server SER may make use of a database DB of locations for cell identifiers.

Then, in test S7, the SER server determines whether the current location LocC is farther from the location Loc0 where the SIM card was placed in service (corresponding to the initial identifier Cell0) than a chosen distance threshold THR. This situation corresponds to the case, for example, where the terminal TER is moved outside the boundaries of the store or restaurant (or construction site) where it is normally used. If this is the case (KO arrow from test S7), the server SER may generate an alarm in step S8 and possibly send a command to the SIM card in step S9 to place it in a blocked state (in which typically it no longer sends notifications to the server, and possibly no longer allows the terminal to connect to the network).

In contrast, if the distance between the current location LocC and the initial location Loc0 remains below the threshold THR (OK arrow from test S7), the server SER does not generate an alarm and returns to a standby state awaiting notification of movement to a new cell.

So, to summarize:
  at startup, the SIM card sends the initial identifier (Cell0) of the cell to which it is connected (and of course adds this initial identifier Cell0 to the whitelist it stores in memory),
  the SIM card then monitors the successive identifiers of cells to which it is connected, as follows:
    detection of a change of current cell identifier CellC,
    verification that the current identifier CellC is in the whitelist stored on the SIM card,
    if the current identifier CellC is in the whitelist, the SIM card ends its operations and returns to a standby mode in order to avoid sending a large number of notifications,
    if the current identifier CellC is not in the whitelist, then:
      the list is updated in the memory MEM of the SIM card by adding the current identifier CellC, and
      the SIM card sends to the server SER a notification including the current identifier CellC,
  the server SER queries a database DB (type "location server") to translate the received current identifier CellC into geographical data (typically a current location LocC for comparison with an original location Loc0 corresponding to the initial cell identifier Cell0),
  the server SER triggers or does not trigger an alarm, depending on the distance between the current location LocC and the original location Loc0.

Notifications from the SIM card to the server SER are, for example, in the form of SMS messages sent to the server (or USSD ("Unstructured Supplementary Service Data") or BIP ("Bearer Independent Protocol") or https, or others).

The advantage of proceeding in this manner according to the invention is therefore that it limits the number of notifications sent (thus avoiding the cost of an SMS notification, and thereby saving bandwidth and energy in the equipment where the SIM card is housed).

The invention thus allows providing an efficient service in the field of geolocation, specifically for supplying an alert in case of movement ("GPS anchor alarm" service), while reducing the notifications sent by the SIM card to the server SER.

This type of service is usually based on GPS/Glonass types of solutions, which eliminates the need for a GPS device (and thus for deploying the service on equipment that has no GPS chip). In addition, the coverage of a cellular network (GSM or UMTS) is often much better than that of a satellite in a GPS application within an urban environment (especially indoors).

Of course, the invention is not limited to the embodiments described above by way of example; it extends to other variants.

For example, above we have described the ability to begin monitoring a change of cell from the moment the SIM card is placed in service in the terminal TER. However, in one variant, the monitoring can begin when so ordered by the server SER after the card is placed in service.

Furthermore, above we have described an embodiment in which the current location is compared to an initial location (with an allowed distance between the two locations). However, in other possible embodiments, it is possible to trigger an alarm in the case where the cell identifier merely corresponds to an unauthorized cell (for example, predetermined and at the periphery of a particular area).

In addition, in the embodiment described above, the method for processing cellular radio data according to the invention is implemented by computer means including a UICC card (commonly referred to as a SIM card). However, in other embodiments, the invention may be implemented by a software module that is distinct from a UICC card and that performs or emulates any or all functionality of a UICC card.

Therefore, in general, the method according to the invention is implemented by a module that is hardware and/or software in nature, referred to herein as a "security module", and, depending on the chosen embodiment, such a security module may comprise a UICC card or may be distinct from a UICC card, and in this latter case the module can then be configured to implement any or all functionality provided by a UICC card.

More generally, the invention applies also with any computer circuit (such as an UICC card above, or any other equivalent computer circuit including for example a processor and a memory as shown in FIG. 1), including a security module for an implementation in a communication terminal.

The invention claimed is:

1. A method for processing cellular radio data, implemented by computer means including a security module, wherein said security module included in a terminal that is in a mobility situation:
   receives a current cell identifier,
   compares the current identifier with an identifier previously stored in memory, the security module being adapted to generate a notification for a remote server when there is a difference between the current identifier and an identifier previously stored in memory, and
   wherein the security module stores in memory a list of current identifiers of respective cells in which the terminal is successively located,
   wherein said security module, upon reception of a current cell identifier, compares the current identifier to identifiers of said stored list and:
      when the current identifier is absent from said stored list, then the security module adds the current identifier to said stored list, and generates said notification for the remote server,
      when the current identifier is already in said stored list, then the security module does not add the current identifier to said stored list, and does not generate said notification for the remote server, and
   wherein a notification sent to the server comprises the current cell identifier, allowing the server to compare a current location of the terminal, corresponding to the current cell identifier, to a predetermined location, and to execute an alert routine if the current location does not satisfy a chosen criterion relative to the predetermined location.

2. The method according to claim 1, wherein said security module is embedded in a SIM card comprised in the terminal.

3. The method according to claim 2, wherein the SIM card carries out the following steps after receiving a current cell identifier:
   a) determines whether the current cell identifier is in said list, and if the current cell identifier is not in the list:
   b) sends a change of cell notification to the server, and
   c) stores said current cell identifier in the list.

4. The method according to claim 3, wherein, in step a), if the current cell identifier is in said list, the SIM card does not send a change of cell notification to the server.

5. The method according to claim 1, wherein the server executes the alert routine if the current location and the predetermined location are separated by a distance greater than a chosen distance threshold.

6. The method according to claim 2, wherein, upon receipt of an alert message from the server, the SIM card disables any transmission of cell change notifications to the server.

7. The method according to claim 2, wherein the SIM card receives a command from the server to initiate execution of the steps of the method.

8. The method according to claim 7, wherein the SIM card receives said command from the server after the SIM card is first placed in service.

9. The method according to claim 1, wherein the terminal is intended for communicating with the remote server in machine-to-machine mode.

10. A SIM card comprising a computer circuit including a memory programmed to carry out the steps of the method according to claim 1.

11. A non-transitory computer readable medium, storing instructions of a computer program, for implementing the method according to claim 1 when the program is executed by a processor.

* * * * *